United States Patent
Zhao et al.

(10) Patent No.: US 12,058,651 B2
(45) Date of Patent: Aug. 6, 2024

(54) METHOD FOR WIRELESS COMMUNICATION, TERMINAL DEVICE AND CHIP

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/375,631

(22) Filed: Oct. 2, 2023

(65) Prior Publication Data
US 2024/0031996 A1    Jan. 25, 2024

Related U.S. Application Data

(63) Continuation of application No. PCT/CN2021/098326, filed on Jun. 4, 2021.

(51) Int. Cl.
*H04W 72/02* (2009.01)
*H04W 72/0446* (2023.01)
*H04W 72/40* (2023.01)

(52) U.S. Cl.
CPC ....... *H04W 72/02* (2013.01); *H04W 72/0446* (2013.01); *H04W 72/40* (2023.01)

(58) Field of Classification Search
CPC ............. H04W 72/02; H04W 72/0446; H04W 72/0453; H04W 72/40
See application file for complete search history.

(56) References Cited

U.S. PATENT DOCUMENTS

| | | | |
|---|---|---|---|
| 2020/0229171 A1 | | 7/2020 | Khoryaev |
| 2020/0260496 A1* | | 8/2020 | Jin ............... H04W 74/006 |
| 2020/0275474 A1 | | 8/2020 | Chen |
| 2022/0116928 A1* | | 4/2022 | Wang .............. H04L 1/1854 |
| 2022/0240278 A1* | | 7/2022 | Dutta .............. H04W 72/1263 |
| 2023/0007660 A1* | | 1/2023 | Ji .................. H04W 72/542 |

(Continued)

FOREIGN PATENT DOCUMENTS

| | | |
|---|---|---|
| CN | 112272397 A | 1/2021 |
| CN | 112543442 A | 3/2021 |
| WO | 2020056696 A1 | 3/2020 |

(Continued)

OTHER PUBLICATIONS

Fujitsu. "Considerations on partial sensing and DRX in NR Sidelink" 3GPP TSG RAN WG1 Meeting #105-e R1-2105066, May 27, 2021 (May 27, 2021), entire document, 18 pages.

(Continued)

*Primary Examiner* — Raj Jain
(74) *Attorney, Agent, or Firm* — BAYES PLLC

(57) ABSTRACT

A method for wireless communication, a terminal device and a chip are provided. The method includes operations as follows. When a first terminal determines that there is no available sidelink transmission resource for the retransmission of target data in a target active time of a second terminal, the first terminal selects a first sidelink transmission resource. The first terminal retransmits the target data by means of the first sidelink transmission resource.

11 Claims, 10 Drawing Sheets

(56) References Cited

U.S. PATENT DOCUMENTS

2023/0345511 A1* 10/2023 Su .................. H04W 72/044

FOREIGN PATENT DOCUMENTS

| WO | 2021064699 A1 | 4/2021 |
|----|---------------|--------|
| WO | 2021071332 A1 | 4/2021 |

OTHER PUBLICATIONS

International Search Report in the international application No. PCT/CN2021/098326, mailed on Feb. 24, 2022, 6 pages with English translation.

English translation of the Written Opinion of the International Search Authority in the international application No. PCT/CN2021/098326, mailed on Feb. 24, 2022, 6 pages with English translation.

3GPP TS 38.214 V16.3.0 (Sep. 2020), "3rd Generation Partnership Project; Technical Specification Group Radio Access Network;NR;Physical layer procedures for data (Release 16)", pp. 152-156, 165 pages.

Qualcomm Incorporated: "Discussion on SL DRX Timers and Others", 3GPP Draft, R2-2105906, 3rd Generation Partnership Project (3GPP), Mobile Competence Centre, 650, Route Des Lucioles; F-06921 Sophia-Antipolis Cedex; France, vol. RAN WG2, No. E-meeting; May 19, 2021-May 27, 2021, May 11, 2021(May 11, 2021), paragraph [2.1.1]. 6 pages.

Vivo: "Resource allocation for sidelink power saving", 3GPP Draft; R1-2100466, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 19, 2021(Jan. 19, 2021), pp. 8-9; figure 5. 14 pages.

Fujitsu: "Discussion on HARQ RTT and Retransmission Timer for SL DRX", 3GPP Draft; R2-2105400, 3rd Generation Partnership Project (3GPP), Mobile Competence Centre; 650, Route Des Lucioles; F-06921 Sophia-Antipolis Cedex; France, vol. Ran WG2, No. electronic; May 19, 2021-May 27, 2021, May 11, 2021(May 11, 2021), pp. 3-4. 5 pages.

LG Electronics: "Discussion on physical layer design considering sidelink DRX operation", 3GPP Draft; R1-2007897, 3rd Generation Partnership Project (3GPP), Mobile Competence Centre; 650, Route Des Lucioles; F-06921 Sophia-Antipolis Cedex; France, vol. Ran WG1, No. E-Meeting; Oct. 26, 2020-Nov. 13, 2020, Oct. 24, 2020 (Oct. 24, 2020), p. 8. 15 pages.

Supplementary European Search Report in the European application No. 21943575.7, mailed on Mar. 12, 2024. 9 pages.

* cited by examiner

METHOD FOR WIRELESS COMMUNICATION, TERMINAL DEVICE AND CHIP

CROSS-REFERENCE TO RELATED APPLICATION

This is a continuation application of International Patent Application No. PCT/CN2021/098326, filed on Jun. 4, 2021, the disclosure of which is hereby incorporated by reference in its entirety.

BACKGROUND

In order to achieve a purpose of energy saving for a terminal, a Discontinuous Reception (DRX) mechanism is introduced in a SideLink (SL). The DRX mechanism is similar to a DRX mechanism of a Uu interface, that is, the terminal receives data transmitted by other terminals during an active time and enters a sleep state during an inactive time of the DRX, to save power consumption.

When a receiving end receives sidelink data transmitted by the transmitting end during the active time, a DRX retransmission timer can be activated. Before the timer invalidates, the receiving end is always in an active time, and expects to receive the sidelink data retransmitted by the transmitting end before the timer invalidates. However, if a sidelink transmission resource used for retransmitting the sidelink data cannot retransmit the sidelink data, the receiving end enters an inactive time when the timer invalidates, and the transmitting end cannot retransmit the sidelink data until the receiving end enters the active time, which results in a very large transmission delay of the sidelink data one the one hand. On the other hand, when the receiving end enters the active time, the delay of the sidelink data may exceed the Packet Delay Budget (PDB) of the sidelink data. Therefore, it is unable to retransmit the sidelink data, and the transmission reliability of the sidelink data is low.

SUMMARY

The embodiments of the present disclosure relate to the field of communication, and more particularly, to a method for wireless communication and a terminal device and a chip, which can reduce a transmission delay of sidelink data and improve transmission reliability of the sidelink data.

A first aspect provides a method for wireless communication, including operations as follows. A first terminal selects a first sidelink transmission resource when the first terminal determines that there is no available sidelink transmission resource for retransmitting target data within target active time of a second terminal, and the first terminal retransmits the target data through the first sidelink transmission resource.

A second aspect provides a terminal device. The terminal device is a first terminal including a processor, a transceiver and a memory for storing a computer program. The processor is configured to call and run the program to select a first sidelink transmission resource when it is determined that there is no available sidelink transmission resource for retransmitting target data within target active time of a second terminal, and the transceiver is configured to retransmit target data through the first sidelink transmission resource.

A third aspect provides a chip processing a processor configured to call and run a computer program from a memory, to cause a first terminal on which the chip is installed to perform: selecting a first sidelink transmission resource when there is no available sidelink transmission resource for retransmitting target data within target active time of a second terminal; and retransmitting the target data through the first sidelink transmission resource.

DETAILED DESCRIPTION

Figure 1:
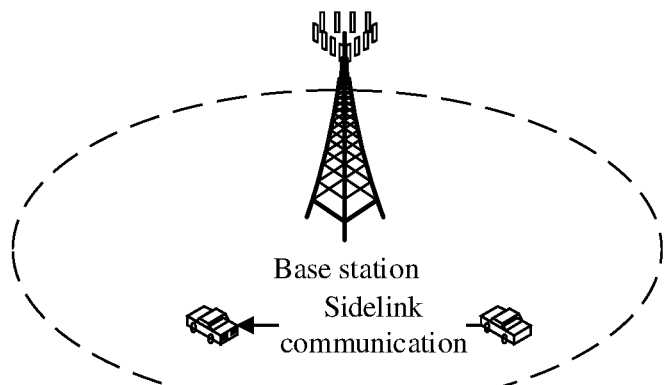
FIG. 1 is a schematic diagram of a sidelink communication within a coverage of a network provided by the present disclosure.

The technical solution in embodiments of the present disclosure will be described below in combination with the appended drawings in embodiments of the present disclosure. Apparently, the described embodiments are part of the embodiments of the present disclosure, rather than all of the embodiments. With respect to the embodiments in the present disclosure, all other embodiments obtained by ordinary persons skilled in the art without creative efforts fall within the scope of protection of the present disclosure.

The technical solution in embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Non-Terrestrial Network (NTN), a Universal Mobile Telecommunications System (UMTS), a Wireless Local Area Network (WLAN), a Wireless Fidelity (WiFi), a 5th Generation (5G) system or other communication systems.

In general, traditional communication systems support a limited number of connections and are easy to implement. However, with the development of the communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) etc. The embodiments of the present disclosure can also be applied to these communication systems.

Alternatively, the communication system in the embodiments of the present disclosure can be applied to Carrier Aggregation (CA) scenarios, Dual Connectivity (DC) scenarios, or Standalone (SA) network deployment scenarios.

Alternatively, the communication system in the embodiments of the present disclosure can be applied to an unlicensed spectrum, which can also be considered as a shared spectrum. Alternatively, the communication system in the embodiments of the present disclosure can also be applied to an authorized spectrum, which can also be considered as a non-shared spectrum.

Each embodiment is described in connection with a network device and a terminal device in the embodiments of the present disclosure. The terminal device may also be referred to as a User Equipment (UE), an access terminal, a user unit, a user station, a mobile station, a remote station, a remote terminal, a mobile device, a user terminal, a terminal, a wireless communication device, a user agent or a user apparatus, etc.

The terminal device may be a station (ST) in the WLAN, a cellular telephone, a cordless telephone, a Session Initiation Protocol (SIP) telephone, a Wireless Local Loop (WLL) station, a Personal Digital Processing (PDA) device, a handheld device having a wireless communication function, a computing device or other processing device connected to a wireless modem, an on-board equipment, a wearable device, a next generation communication system, such as a terminal device in an NR network, or a terminal device in a future evolved Public Land Mobile Network (PLMN), etc.

In the embodiments of the present disclosure, the terminal device may be arranged on land including indoor or outdoor areas, handheld, wearable or on-board. The terminal device may also be arranged on the water (such as on a ship). The terminal device may further be arranged on the air (such as on an airplane, a balloon, or a satellite).

In the embodiments of the present disclosure, the terminal device may be a mobile phone, a tablet computer (or Pad), a computer with wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, or a wireless terminal equipment in a smart home, etc.

As an example rather than a limitation, in the embodiments of the present disclosure, the terminal device may also be a wearable device. The wearable device can also be referred to as wearable intelligent device, which are a general name of the wearable devices developed by intelligently designing for the daily wears with a wearable technology, such as glasses, gloves, watches, clothing and shoes. The wearable device is a portable device that is worn directly on the body or integrated into the user's clothes or accessories. The wearable device is not only a hardware device, but also a device realizing powerful functions through software support, data interaction and cloud interaction. Generalized wearable intelligent devices include: a device (such as intelligent watches or intelligent glasses) with full functions and large size, which can implement complete or partial functions without relying on a intelligent phone, and a device (such as various intelligent bracelets and intelligent jewelries for monitoring physical signs) which only focuses on a certain application function, and is used in conjunction with other devices (such as smart phone).

In the embodiments of the present disclosure, the network device may be a device for communicating with a mobile device, and the network device may be an Access Point (AP) in the WLAN, a Base Transceiver Station (BTS) in the GSM or CDMA, a NodeB (NB) in the WCDMA, an Evolutional Node B (eNB or eNodeB) in the LTE, a relay station or an AP, an on-board equipment or a wearable device, a network device or gNB in an NR network or a network device in a future evolved PLMN network, or the network device in the NTN network.

As an example rather than a limitation, in the embodiments of the present disclosure, the network device may have mobility, for example, the network device may be a mobile device. Optionally, the network device can be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Optionally, the network device can also be a base station arranged on land, water and the like.

In the embodiments of the present disclosure, the network device can provide services for a cell, and the terminal device communicates with the network device through the transmission resource (such as a frequency domain resource, also called a spectrum resource) used by the cell. The cell may be a cell corresponding to the network device (e.g., base station), and the cell may belong to a macro base station or a base station corresponding to a small cell. The small cell may include a metro cell, a micro cell, a pico cell, a femto cell, etc. These small cells have characteristics of small coverage and low transmission power, which are suitable for providing services of high-speed data transmission.

It should be understood that terms "system" and "network" in the present disclosure may usually be exchanged. In the present disclosure, the term "and/or" is only used for describing an association relationship of associated objects and represents that three relationships may exist. For example, A and/or B may represent three conditions: independent existence of A, existence of both A and B, and independent existence of B. Character "/" in the present disclosure usually represents that previous and next associated objects form an "or" relationship.

Terms partly used in the embodiments of the present disclosure are used only for explanation of specific embodiments of the present disclosure, and are not intended to limit the present disclosure. Terms "first", "second", "third", "fourth" and the like in the description, the claims and the accompanying drawings of the present disclosure are used to distinguish different objects rather than using to describe a particular order. Furthermore, the terms "include" and "have" and any variations thereof are intended to cover non-exclusive inclusion.

It should be understood that the "indication" mentioned in the embodiments of the present disclosure may be a direct indication, may be an indirect indication, or may represent an association relationship. For example, A indicating B may represent that A directly indicates B, e.g., B can be obtained through A, may also represent that A indirectly indicates B, e.g., A indicates C, and B can be obtained through C, or may also represent that there is an association relationship between A and B.

In the description of the embodiments of the disclosure, the term "corresponding to" may represent that there is a direct correspondence or an indirect correspondence relationship between two elements, may also represent that there is an association relationship between the two elements, may also be a relationship in which one element indicates or is indicated by the other element, or one element configures or is configured by the other element, etc.

In embodiments of the present disclosure, "pre-defined" may be implemented by pre-storing corresponding codes, tables or other means that may be used to indicate relevant information in devices (e.g., including a terminal device and a network device), specific implementations of which are not limited herein. For example, the "pre-defined" can refer to what is defined in "protocol".

In the embodiments of the present disclosure, the "protocol" may refer to standard protocols in the communication field, for example, may include a LTE protocol, a NR protocol and related protocols applied in future communication systems, which are not limited in the present disclosure.

Before introducing the technical solution of the present disclosure, the related knowledge of the present disclosure are described as follow:

Sidelink communications under different network coverage environments are described.

Figure 2:
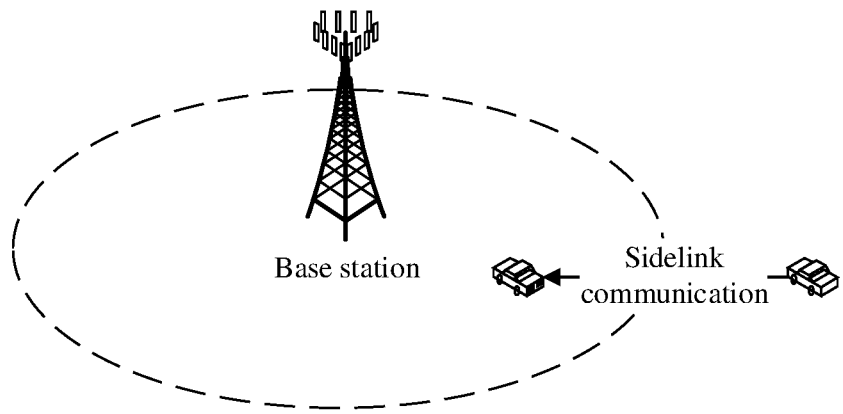
FIG. 2 is a schematic diagram of a sidelink communication in a partial coverage of a network provided by the present disclosure.
Figure 3:
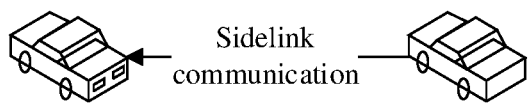
FIG. 3 is a schematic diagram of a sidelink communication outside a coverage of a network provided by the present disclosure.

A sidelink communication can be classified, according to network coverage where a communication terminal is located, into a sidelink communication within the network coverage, a sidelink communication in partial network coverage and a sidelink communication outside the network coverage, as shown in FIG. 1, FIG. 2 and FIG. 3, respectively.

As shown in FIG. 1, in the sidelink communication within network coverage, all terminals performing the sidelink communication are within the coverage of a same base station, and the terminals can perform the sidelink communication based on the same sidelink configuration by receiving a configuration signaling of the base station.

As shown in FIG. 2, in the sidelink communication in partial network coverage, a part of terminals performing the sidelink communication are within the coverage of a base station, and the part of terminals can receive a configuration signaling of the base station and perform sidelink communication according to the configuration of the base station. However, terminals outside the coverage of the network cannot receive the configuration signaling of the base station. In such a case, the terminals outside the coverage of a network determines a sidelink configuration according to pre-configuration information and the information carried in the Physical Sidelink Broadcast Channel (PSBCH) transmitted by the terminals within the coverage of the network, and perform sidelink communication.

As shown in FIG. 3, in the sidelink communication outside the network coverage, all terminals performing the sidelink communication are outside the coverage of a network, and all the terminals determine a sidelink configuration according to pre-configuration information and perform sidelink communication.

Transmission modes in Device to Device (D2D) or Vehicle to Everything (V2X) are described as follows.

A D2D communication is a sidelink transmission technology based on the D2D, which is different from the traditional cellular system in which communication data is received or transmitted through a base station. Therefore, it has a higher spectrum efficiency and a lower transmission delay. The V2X system adopts a mode of terminal-to-terminal direct communication, and two transmission modes including a first mode and a second mode are defined in the 3rd Generation Partnership Project (3GPP).

In the first mode, a transmission resource of a terminal is allocated by a base station, and the terminal transmits data on the sidelink according to the resource allocated by the base station. The base station can allocate a resource for a single transmission or a resource for a semi-static transmission to the terminal. As shown in FIG. 1, the terminal is within coverage of a network, and the network allocates a transmission resource for the sidelink transmission to the terminal.

In the second mode, a terminal selects one resource for data transmission from a resource pool. As shown in FIG. 3, the terminal is outside coverage of a cell, and the terminal independently selects a transmission resource from a pre-configured resource pool for sidelink transmission. Alternatively, as shown in FIG. 1, the terminal independently selects a transmission resource for a sidelink transmission from a resource pool configured by a network.

New Radio (NR)-V2X is described as follows.

Automatic driving is supported in the NR-V2X, which demands a higher requirement for data interaction between vehicles, such as a higher throughput, a lower delay, a higher reliability, larger coverage and a more flexible resource allocation.

Figure 4:
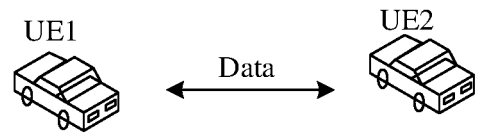
FIG. 4 is a schematic diagram of a unicast transmission provided by an embodiment the present disclosure.
Figure 5:
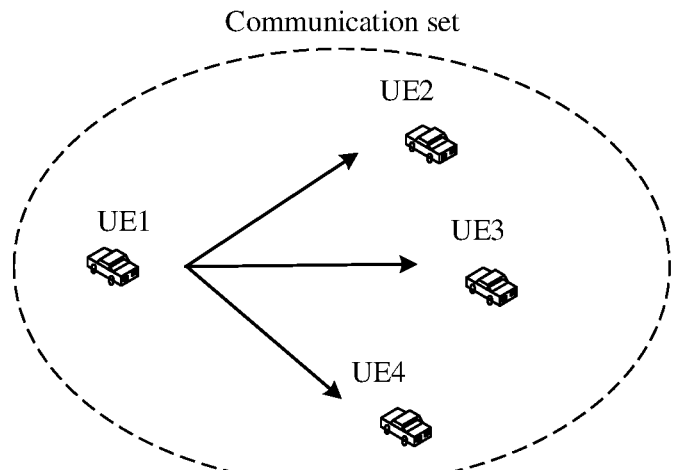
FIG. 5 is a schematic diagram of a multicast transmission provided by an embodiment of the present disclosure.
Figure 6:
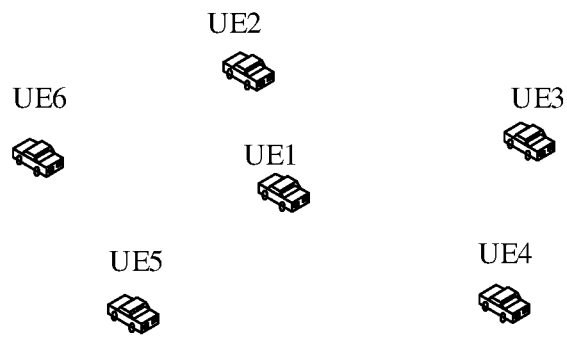
FIG. 6 is a schematic diagram of a broadcast transmission provided by an embodiment of the present disclosure.

A broadcast transmission mode is supported in Long Term Evolution (LTE)-V2X, and a unicast transmission mode and a multicast transmission mode are introduced in the NR-V2X. For the unicast transmission, a receiving end includes only one terminal. As shown in FIG. 4, the unicast transmission is performed between UE1 and UE2. For the multicast transmission, a receiving end includes all terminals in a communication group or all terminals within a certain transmission distance. As shown in FIG. 5, UE1, UE2, UE3 and UE4 constitute a communication group, in which the UE1 transmits data, and the receiving end is other terminal devices in the communication group. For the broadcast transmission mode, a receiving end is any one of terminals around a transmitting end. As shown in FIG. 6, UE1 is a terminal at the transmitting end, and the receiving end is other terminals (UE2-UE6) around the UE1.

Sidelink feedback channel is described.

In order to improve the reliability of the NR-V2X, a sidelink feedback channel is introduced. For example, in the unicast transmission, a transmitting end transmits sidelink data to a receiving end, including a Physical Sidelink Control Channel (PSCCH) and a Physical Sidelink Shared Channel (PSSCH), the receiving end transmits Hybrid Automatic Repeat request (HARQ) feedback information to the transmitting end. The transmitting end determines whether a retransmission is required according to the feedback information of the receiving end. The HARQ feedback information is carried in the sidelink feedback channel, such as a Physical Sidelink Feedback Channel (PSFCH).

Optionally, the sidelink feedback can be activated or deactivated by pre-configuration information or network configuration information. If the sidelink feedback is activated, a receiving end receives sidelink data transmitted by a transmitting end and transmits HARQ feedback information to the transmitting end according to a detection result, and the transmitting end determines to transmit retransmission data or new data according to the feedback information of the receiving end. If the sidelink feedback is deactivated, the receiving end does not transmit feedback information, and the transmitting end transmits data by blind retransmission. For example, the transmitting end repeatedly transmits sidelink data K times, instead of determining whether to retransmit the data according to the feedback information of the receiving end.

Resource selection manners are described as follows.

As for the second mode described above, the terminal can independently select the sidelink transmission resource from the resource pool, for example, a physical layer of the terminal can take a set composed of all resources in a selection window as a candidate resource set and report the candidate resource set to a higher layer. The higher layer randomly selects a sidelink transmission resource from the candidate resource set. Alternatively, the physical layer of the terminal can select a resource in the selection window based on listening results of a listening window and take a set of these resources as a candidate resource set, and report the candidate resource set to a higher layer, and the higher layer randomly selects a sidelink transmission resource from the candidate resource set. The latter is also referred to as a listening-based resource selection method.

It should be understood that any of the sidelink transmission resource selected by the higher layer can be used for an initial transmission or a retransmission of the sidelink data, which is not limited in the present disclosure.

A listening-based random selection method includes the following steps of, but is not limited thereto.

A terminal takes all available resources in a selection window as a candidate resource set A.

If there are no listening results in some slots in a listening window, the terminal excludes resources of slots in the resource selection window corresponding to these slots according to resource reservation period parameters allowed by the resource pool.

If a PSCCH in the listening window is detected, the terminal measures a Reference Signal Received Power (RSRP) of the PSCCH or a RSRP of a PSSCH scheduled by the PSCCH. If the measured RSRP is higher than a RSRP threshold, and a resource conflict between reserved transmission resources determined according to reserved information in the PSCCH and data to be transmitted by the terminal exists, the reserved transmission resources are excluded from the set A. The RSRP threshold is determined by priority information carried in the detected PSCCH and a priority of the data to be transmitted by the terminal.

If a number of remaining resources in the set A is less than X % of a number of total resources (for example, X=20), the terminal will raise the RSRP threshold by 3 dB and repeat the steps 1 to 3 until the number of the remaining resources in the set A is greater than X % of the number of the total resources.

The terminal reports the set A to a higher layer.

The higher layer of the terminal selects a resource from the set A for the data transmission with equal probability.

DRX mechanism of a Uu interface is described.

In a wireless network, when there is data to be transmitted, a terminal keeps listening to a Physical Downlink Control Channel (PDCCH) to transmit or receive data according to indication information transmitted by a network side, resulting in a large power consumption and a large data transmission delay of the terminal. Therefore, a DRX mechanism is introduced in the LTE system in the 3GPP standard protocol.

Figure 7:
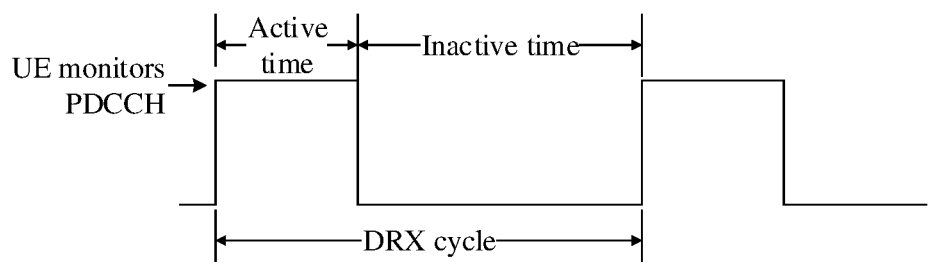
FIG. 7 is a schematic diagram of a DRX mechanism of a NR Uu interface provided by an embodiment of the present disclosure.

The DRX mechanism is to configure a DRX cycle for a terminal in a RRC connected state (RRC_CONNECTED). The DRX cycle consists of an On Duration and an Opportunity for DRX. As shown in FIG. 7, the On Duration is also referred to as an active time, in which the terminal listens and receives the PDCCH. The Opportunity for DRX is also referred to as an inactive time or a dormancy time, in which the terminal does not receive the PDCCH to reduce the power consumption. As for the On Duration, the Opportunity for DRX can also be referred to as a DRX off duration.

In the DRX mechanism, the terminal controls the On Duration and the Opportunity for DRX according to some timer parameters configured by the network.

SL DRX mechanism is described as follows.

In order to energy saving for a terminal, a DRX mechanism is introduced in a SL, which is similar to the DRX mechanism of the Uu interface. That is, the terminal receives data transmitted by other terminals within the active time and enters a sleep state within the inactive time of the DRX to save the power consumption.

Timers in the SL DRX mechanism are described as follows.

Some timers are introduced in the SL DRX mechanism, to control the terminal to switch between the active time and the inactive time. Typical timers in the SL DRX mechanism includes a sidelink DRX-onDuration timer (sl-drx-onDurationTimer), a sidelink DRX-Inactivity timer (sl-drx-InactivityTimer), a sidelink DRX-HARQ-Round-Trip timer (RTT)-Timer (sl-drx-HARQ-RTT-Timer) and a sidelink DRX-retransmission timer (sl-drx-Retransmis sionTimer).

Figure 8:
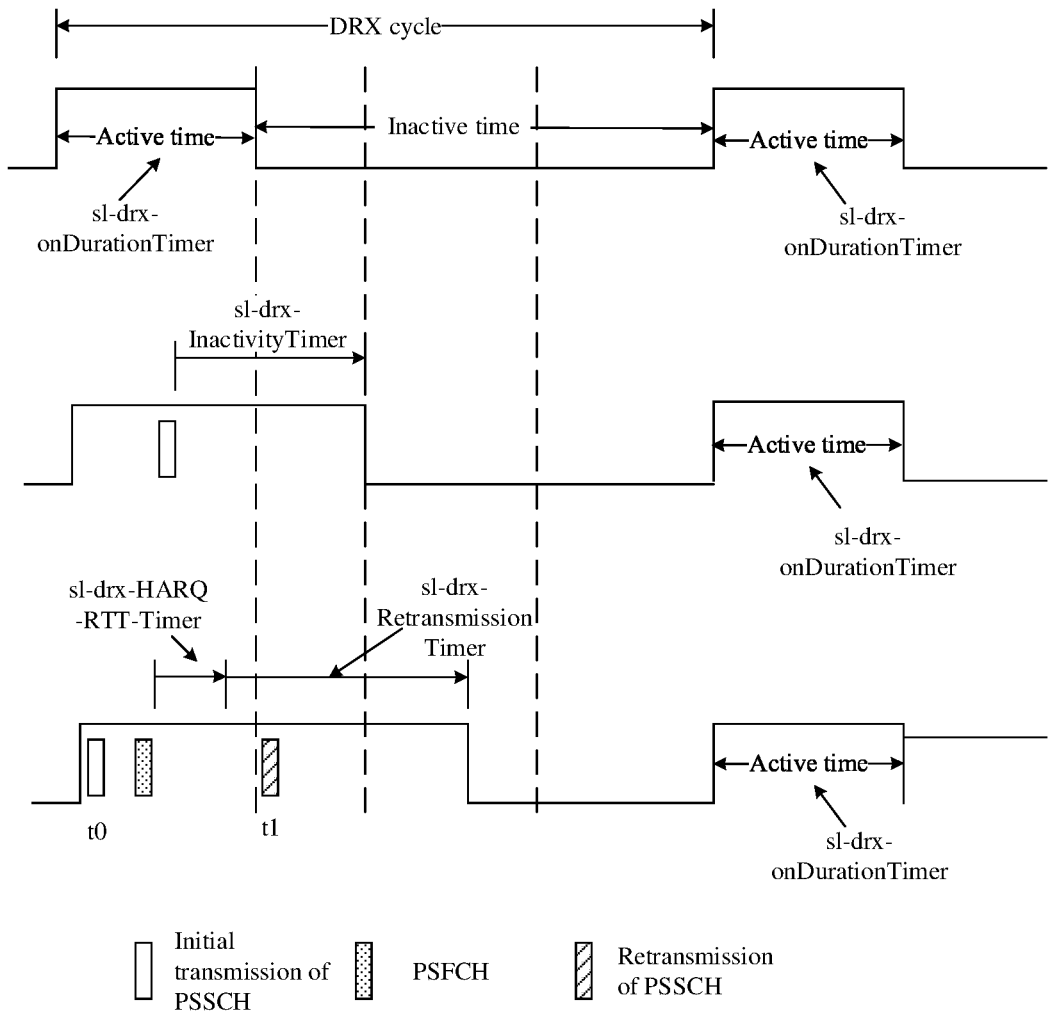
FIG. 8 is a schematic diagram of a SL DRX mechanism provided by an embodiment of the present disclosure.

The sidelink DRX-onDuration timer (sl-drx-onDuration-Timer) includes the duration at the beginning of a DRX cycle. As shown in FIG. 8, a terminal is in the active time within an active range of the timer, and the terminal device switches to the inactive time when the timer is inactive.

The sidelink DRX-Inactivity timer (sl-drx-InactivityTimer) includes the duration after the PSCCH occasion in which a PSCCH indicates a new SL transmission for the MAC entity. As shown in FIG. 8, the timer is started when a terminal receives the PSCCH indicating the new SL transmission transmitted to the terminal, and the terminal is in the active time within the active range of the timer.

The sidelink DRX-HARQ-Round-Trip timer (RTT)-Timer (sl-drx-HARQ-RTT-Timer) includes the minimum duration before a SL assignment for HARQ retransmission is expected by the MAC entity. As shown in FIG. 8, a terminal does not expect the transmitting end to retransmit within the range of the timer. Therefore, the terminal can be in the inactive time within the range of the timer.

The sidelink DRX-retransmission timer (sl-drx-RetransmissionTimer) includes the maximum duration until a grant for SL retransmission is received. As shown in FIG. 8, before the timer is inactive, a terminal expects to receive a retransmission of the transmitting end. Therefore, the terminal is in the active time within the range of the timer. The timer can be started when the sl-drx-HARQ-RTT-Timer is inactive.

It should be understood that in the SL DRX mechanism, the terminal is in the active time when any one of the sl-drx-onDurationTimer, the sl-drx-InactivityTimer, and the sl-drx-RetransmissionTimer is running.

Alternatively, the active time of the sl-drx-InactivityTimer can be configured to be longer, causing that the sl-drx-InactivityTimer is inactive after the sl-drx-RetransmissionTimer is inactive.

It should be understood that the above description of the timers of the SL DRX is only exemplary, and the timer of the SL DRX is not limited thereto and may include other timers.

Figure 9:
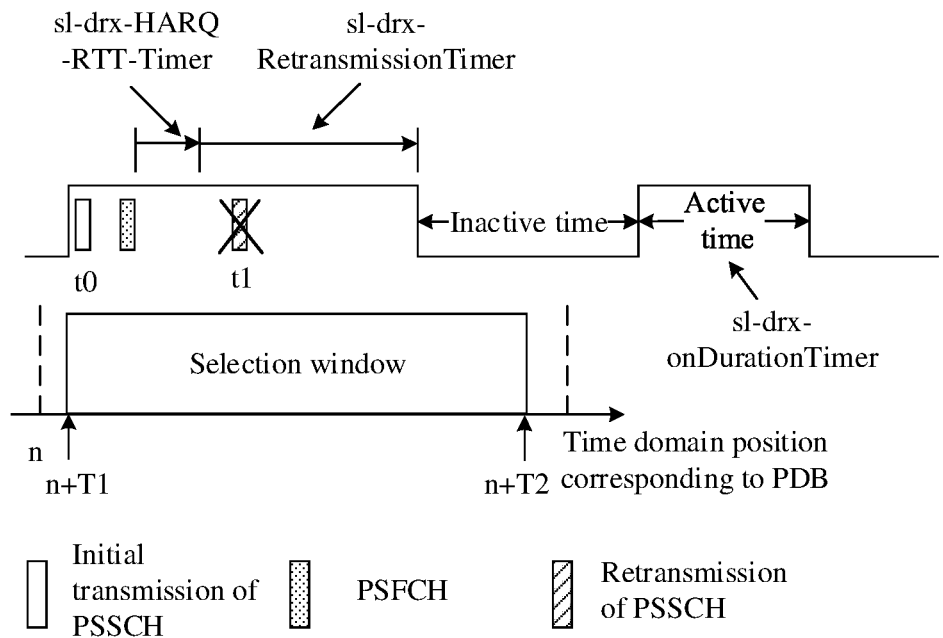
FIG. 9 is a schematic diagram of a sidelink transmission provided by an embodiment of the present disclosure.

It should be noted that, as shown in FIG. 8, after receiving an initial transmission of a PSSCH (i.e., sidelink data initially transmitted), a receiving end can transmit a PSFCH carrying sidelink HARQ information to a transmitting end, for example, the PSFCH carries Negative Acknowledge (NACK) information, which indicates that the receiving end has not received the sidelink data correctly. After the receiving end transmits the PSFCH, a sl-drx-HARQ-RTT-Timer starts, and before the sl-drx-HARQ-RTT-Timer is inactive, the receiving end does not expect the transmitting end to perform retransmission, and the receiving end can be in the inactive time. Other timers run within the range of the sl-drx-HARQ-RTT-Timer, such as a sl-drx-onDurationTimer and a sl-drx-InactivityTimer. Therefore, the receiving end remains in the active time. When the sl-drx-HARQ-RTT-Timer is inactive, the receiving end starts the sl-drx-RetransmissionTimer, and remains in the active time before the sl-drx-RetransmissionTimer is inactive. The receiving end expects to receive a retransmission data transmitted by the transmitting end before the sl-drx-RetransmissionTimer is inactive. If the transmitting end does not perform the retransmission before the sl-drx-RetransmissionTimer is inactive, for example, as shown in FIG. 9, although the transmitting end selects a retransmission resource in a time domain position t1, because there is a uplink transmission at the time domain position t1 and the uplink transmission has a higher priority, the transmitting end performs the uplink transmission and discards the sidelink transmission, resulting in that the receiving end does not receive the retransmission before the sl-drx-RetransmissionTimer is inactive. When the sl-drx-RetransmissionTimer is inactive, the receiving end switches to the inactive time, the receiving end in the inactive time does not receive the sidelink data transmitted by the transmitting end, and only when the receiving end switches to the active time, the receiving end can receive the sidelink data transmitted by the transmitting end, resulting in a very large transmission delay of the sidelink data one the one hand. On the other hand, when the receiving end switches to the active time, the delay of the sidelink data may have exceeded the Packet Delay Budget (PDB) of the sidelink data, resulting in that it is unable to retransmit the sidelink data, and a low transmission reliability of the sidelink data.

In order to solve the above technical problem, when a transmitting end determines that there is no available sidelink transmission resource for retransmitting sidelink data within current active time of a receiving terminal, the transmitting end in the present disclosure reselects a sidelink transmission resource, for transmitting the sidelink data.

It should be noted that the active range of any one of the sl-drx-onDurationTimer, the sl-drx-InactivityTimer, the sl-drx-HARQ-RTT-Timer and the sl-drx-RetransmissionTimer described above is also referred to as an operation period or an operation range of the timer, which is not limited in the present disclosure.

It should be noted that the sl-drx-onDurationTimer, the sl-drx-InactivityTimer, the sl-drx-HARQ-RTT-Timer and the sl-drx-RetransmissionTimer described above are distinguished from the drx-onDurationTimer, the drx-InactivityTimer, the drx-HARQ-RTT-Timer and the drx-RetransmissionTimer involved in the Uu interface transmission. Therefore, in an SL scenario, the sl-drx-onDurationTimer, the sl-drx-InactivityTimer, the sl-drx-HARQ-RTT-Timer and the sl-drx-RetransmissionTimer described above can be referred to as the drx-onDurationTimer, the drx-InactivityTimer, the drx-HARQ-RTT-Timer and the drx-RetransmissionTimer, respectively.

In addition, in practice, the operating mechanism of the sl-drx-onDurationTimer is similar with that of the drx-onDurationTimer in the Uu interface transmission, the operating mechanism of the sl-drx-InactivityTimer is similar with that of the drx-InactivityTimer in the Uu interface transmission, the operating mechanism of the sl-drx-HARQ-RTT-Timer is similar with that of the drx-HARQ-RTT-Timer in the Uu interface transmission, the operating mechanism of the sl-drx-RetransmissionTimer is similar with that of the drx-RetransmissionTimer in the Uu interface transmission. Therefore, reference can be made to the operating mechanisms of the corresponding timers in the Uu interface transmission with respect to the operation mechanisms of these timers.

The technical solution of the present disclosure is described in detail in combination with the above related knowledge.

Figure 10:
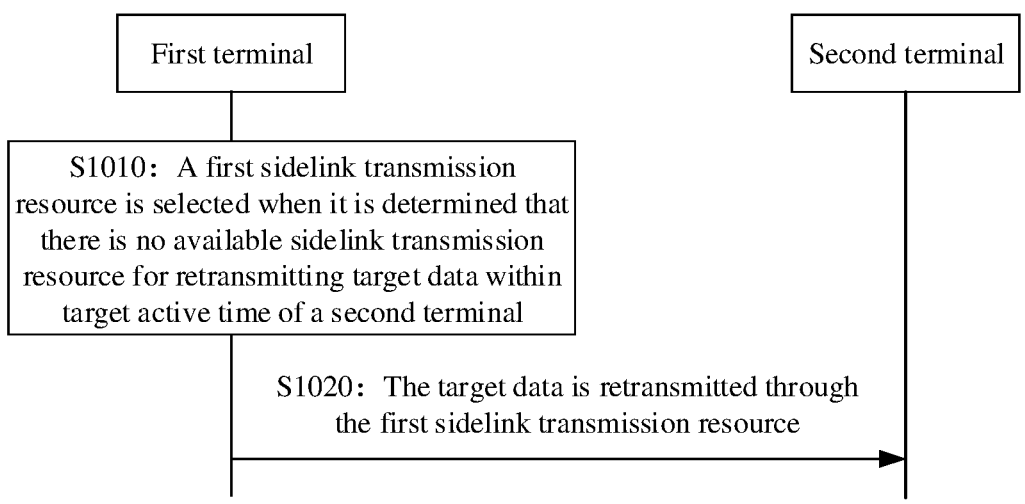
FIG. 10 is an interactive flow diagram of a method for wireless communication provided by an embodiment of the present disclosure.

FIG. 10 is an interactive flow diagram of a method for wireless communication provided by an embodiment of the present disclosure. As shown in FIG. 10, the method includes the following operations.

At S1010, a first terminal selects a first sidelink transmission resource when the first terminal determines that there is no available sidelink transmission resource for retransmitting target data within a target active time of a second terminal.

At S1010, the first terminal retransmits the target data through the first sidelink transmission resource.

It should be understood that the first terminal serves as a transmitting end and the second terminal serves as a receiving end from the view of transmitting the target data. Therefore, in the present disclosure, the first terminal is also referred to as the transmitting end and the second terminal is also referred to as the receiving end.

It should be understood that the target data can be any sidelink data transmitted from the first terminal to the second terminal, and the target data can also be referred to as a target sidelink data, which is not limited in the present disclosure.

It should be understood that since the active time and the inactive time of the second terminal are arranged at intervals, the target active time herein refers to a current active time, that is, an active time in which an initial transmission or a retransmission of the target data is located. For example, as shown in FIG. 9, the target active time can be an active time in which a time domain position t0 (i.e., a time domain position for the initial transmission the target data) or a time domain position t1 (i.e., a time domain position for the retransmission of the target data) is located.

It should be noted that the time domain position provided in the present disclosure can be a time slot, a starting position of a time slot, an ending position of a time slot, a time domain symbol, a starting position of a time domain symbol, an ending position of a time domain symbol or a time moment, etc., which is not limited in the present disclosure. For example, the time domain position provided in the present disclosure can be understood as a time slot.

Alternatively, the first terminal triggers reselection of resources, and the reselected a sidelink transmission resource, i.e., the first sidelink transmission resource, is a sidelink transmission resource located within the target active time.

It should be understood that, assuming that the sidelink transmission resource for retransmitting the target data determined before the first terminal determines that there is no available sidelink transmission resource for retransmitting the target data within the target active time of the second terminal are referred to as the second sidelink transmission resource. Optionally, the second sidelink transmission resource is a transmission resource within the target active time.

It should be understood that the time domain position where the first terminal determines that the second sidelink transmission resource corresponding to the target data cannot be used is referred to as a first time domain position. The first time domain position may be within the target active time.

It should be understood that the first sidelink transmission resource is a sidelink transmission resource reselected when the first terminal determines that there is no available sidelink transmission resource for retransmitting the target data within the target active time of the second terminal. The second sidelink transmission resource may be seen that the second sidelink transmission resource is a pre-selected resource for retransmitting the target data, that is, the second sidelink transmission resource is a pre-selected resource with respect to the first sidelink transmission resource. Therefore, the second sidelink transmission resource is also referred to as a preselected sidelink transmission resource, a preselected transmission resource, a preselected resource, etc., which is not limited in the present disclosure.

It should be understood that the first terminal determines that there is no available sidelink transmission resource for retransmitting the target data within the target active time of the second terminal, in which the sidelink transmission resource refers to a sidelink transmission resource preselected by the first terminal. When there is no available sidelink transmission resource within the target active time of the second terminal, it indicates that there is no preselected sidelink transmission resource within the target active time of the second terminal. Optionally, the preselected sidelink transmission resource is the second sidelink transmission resource.

Figure 11:
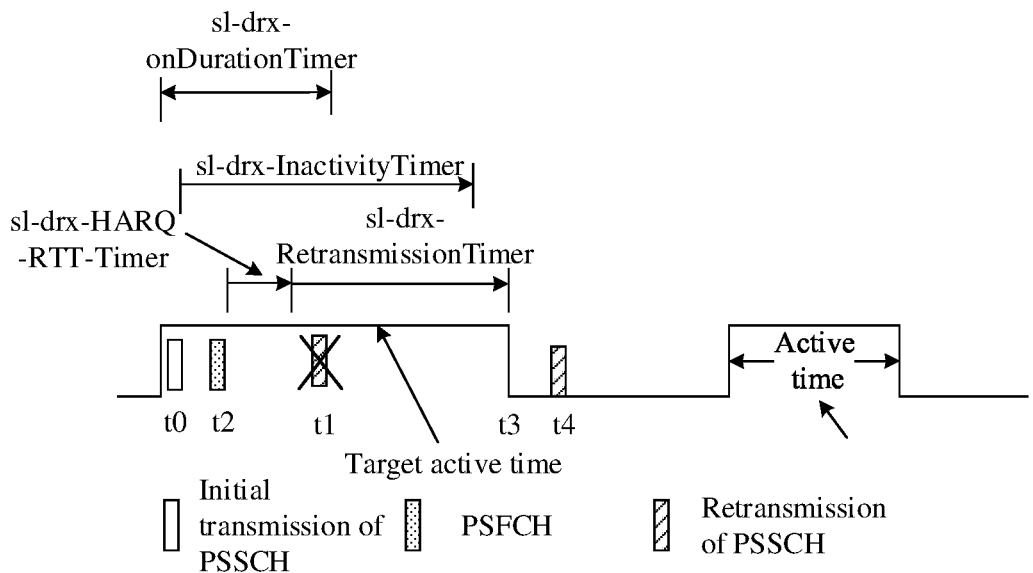
FIG. 11 is a schematic diagram of a sidelink transmission provided by an embodiment of the present disclosure.
Figure 12:
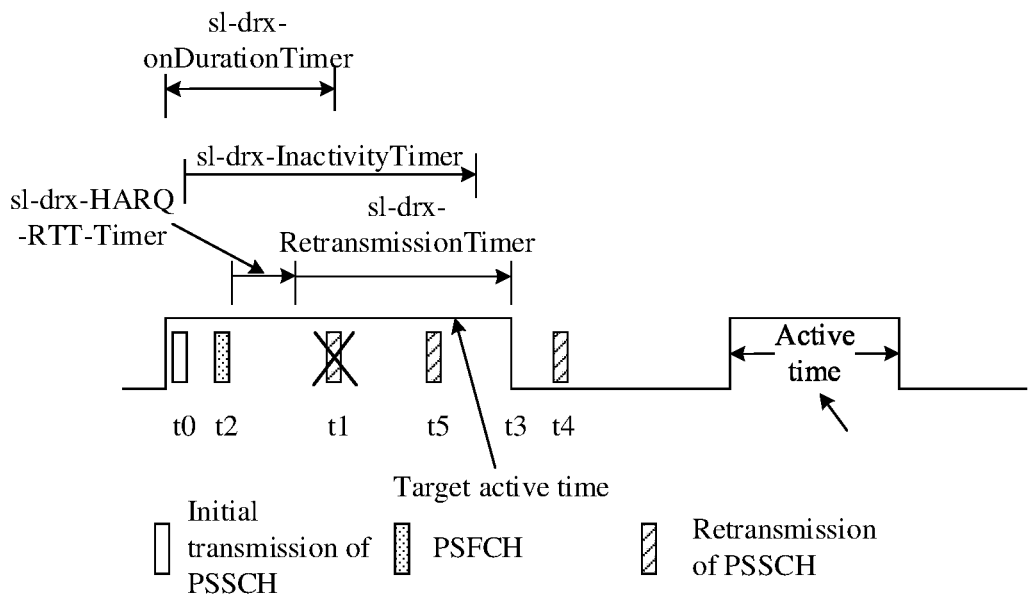
FIG. 12 is a schematic diagram of a sidelink transmission provided by another embodiment of the present disclosure.

It should be understood that since the application scenario of the present disclosure is an application scenario that the first terminal determines that there is no available sidelink transmission resource for retransmitting the target data within the target active time of the second terminal, that is, the second sidelink transmission resource is selected or allocated to the first terminal, but the second sidelink transmission resource cannot be used. For example, FIG. 11 is a schematic diagram of a sidelink transmission provided by an embodiment of the present disclosure. As shown in FIG. 11, a retransmission resource at the time domain position t1 is located within the target active time of the second terminal, but the first terminal cannot use the resource to retransmit the target data. If the first terminal needs to perform both uplink transmission and sidelink transmission at the time domain position t1, and the uplink transmission has a higher priority, the first terminal performs the uplink transmission and does not use the resource at the time domain position t1 for the sidelink transmission. In addition, even if there is a retransmission resource corresponding to the target data at a time domain position t4, the retransmission resource at the time domain position t4 is located within the inactive time of the second terminal. On the contrary, FIG. 12 is a schematic diagram of sidelink transmission provided by another embodiment of the present disclosure. As shown in FIG. 12, a retransmission resource at the time domain position t1 is located within the target active time of the second terminal, but the first terminal cannot use the resource for a retransmission, there is a retransmission resource corresponding to the target data at the time domain position t5, and the retransmission resource at the time domain position t5 is located within the target active time of the second terminal. Therefore, in such a case, the first terminal determines that there is a available sidelink transmission resource for retransmitting the target data within the target active time of the second terminal.

It should be understood that the first sidelink transmission resource is a reselected resource for retransmitting the target data. Therefore, the operation that the first terminal selects the first sidelink transmission resource is also referred to as an operation that the first terminal reselects the first sidelink transmission resource. The result that the first terminal determines that there is no available sidelink transmission resource for retransmitting the target data within the target active time of the second terminal is a triggering condition for the operation that the first terminal selects or reselects the first sidelink transmission resource, or a condition for triggering the first terminal to select or reselect the first sidelink transmission resource. That is, when the first terminal determines that there is no available sidelink transmission resource for retransmitting the target data within the target active time of the second terminal, the first terminal is triggered to select or reselect the resource.

It should be noted that the target data may be retransmitted based on feedback information transmitted by the second terminal. Alternatively, in the case that sidelink feedback is deactivated, the target data may be retransmitted by the first terminal in a blind retransmission mode, which is not limited in the present disclosure.

To sum up, in the present disclosure, when a first terminal determines that there is no available sidelink transmission resource for retransmitting target data within target active time of a second terminal, the first terminal can select a first sidelink transmission resource and retransmit the target data through the first sidelink transmission resource. On the one hand, compared with the prior art in which the first terminal cannot retransmit the target data until the second terminal enters the active time, the technical solutions provided by the present disclosure can reduce the transmission delay of the target data. On the other hand, since the first terminal can select the first sidelink transmission resource and transmit the target data through the first sidelink transmission resource, which ensures that the delay of the target data does not exceed the PDB of the target data, thereby improving the transmission reliability of the target data.

Optionally, the first terminal can determine a candidate resource set according to resources in a target selection window, and select the first sidelink transmission resource from the candidate resource set.

It should be understood that the target selection window is a selection window for selecting the first sidelink transmission resource. According to a process for selecting the sidelink resource, the second sidelink transmission resource is also selected from a selection window, and the target selection window may be different from the selection window. That is, the first terminal determines another selection window when selecting the first sidelink transmission resource.

Optionally, a physical layer of the terminal can take a set of all resources in the target selection window as the candidate resource set and report the candidate resource set to a higher layer, and the higher layer randomly selects a sidelink transmission resource from the candidate resource set. Alternatively, the physical layer of the terminal can select a resource in the selection window based on a listening result of a target listening window and take a set of these resources as a candidate resource set, and report the candidate resource set to a higher layer, and the higher layer randomly selects the sidelink transmission resource from the candidate resource set. As described above, the latter case is also referred to as a listening-based resource selection method.

It should be understood that the target listening window corresponds to the target selection window. For example, as described in the sixth point of the related knowledge, if there are no listening results in some slots in the target listening window, the terminal excludes a resource of slots in the target selection window corresponding to these slots. If a PSCCH in the target listening window is detected, the terminal measures a RSRP of the PSCCH or a RSRP of a PSSCH scheduled by the PSCCH. If the measured RSRP is higher than a RSRP threshold and a resource conflict between reserved transmission resources determined according to reserved information in the PSCCH and data to be transmitted by the terminal exists, the reserved transmission resources are excluded from the set A.

It should be understood that according to a process of the listening-based resource selection, the second sidelink transmission resource is also selected from a selection window based on a listening result of a listening window, and the target listening window may be different from the listening window. That is, the first terminal determines another listening window when selecting the first sidelink transmission resource.

After introducing the target selection window, a starting time domain position of the target selection window is determined through implementations below, but is not limited thereto.

In a first implementation manner, the starting time domain position of the target selection window is determined according to a sidelink DRX-HARQ-RTT-Timer.

In a second implementation manner, the starting time domain position of the target selection window is determined according to a time domain position of second sidelink transmission resource corresponding to the target data.

In a third implementation manner, the starting time domain position of the target selection window is determined according to a first time domain position.

The first implementation is described as follows.

Optionally, the starting time domain position of the target selection window is determined based on a time domain position at which the sidelink DRX-HARQ-RTT-Timer is inactive.

It should be understood that the time domain position at which the sidelink DRX-HARQ-RTT-Timer is inactive is also referred to as an inactive time, an inactive time instant, or an inactive slot, etc., which is not limited in the present disclosure.

It should be understood that the sidelink DRX-HARQ-RTT-Timer is a DRX timer of the second terminal.

As described above, the second terminal does not expect the first terminal to perform the retransmission within an active range of the sidelink DRX-HARQ-RTT-Timer. Therefore, the first terminal can select the first sidelink transmission resource after the sidelink DRX-HARQ-RTT-Timer is inactive. Based on this, the first terminal can set the starting time domain position of the target selection window as the time domain position at which the sidelink DRX-HARQ-RTT-Timer is inactive or a time domain position corresponding to a slot next to the time domain position at which the sidelink DRX-HARQ-RTT-Timer is inactive, which is not limited in the present disclosure. For example, assuming that the time domain position is indicated by a slot, a starting slot of the target selection window is an inactive slot of the sidelink DRX-HARQ-RTT-Timer or a slot next to the inactive slot. For another example, the starting time domain position of the target selection window is a starting position or an ending position of the inactive slot of the sidelink DRX-HARQ-RTT-Timer, or the starting time domain position of the target selection window is a starting position or an ending position of a slot next to the inactive slot of the sidelink DRX-HARQ-RTT-Timer. For yet another example, the first terminal reselects a resource at the time at which the sidelink DRX-HARQ-RTT-Timer of the second terminal is inactive, and the determined starting time domain position in the target selection window is $n+T_1$, where n represents a slot corresponding to the inactive time of the sidelink DRX-HARQ-RTT-Timer, $0 \leq T_1 \leq T_{proc,1}^{SL}$, $T_{proc,1}^{SL}$ is determined according to a size of subcarrier spacing of the sidelink.

Figure 13:
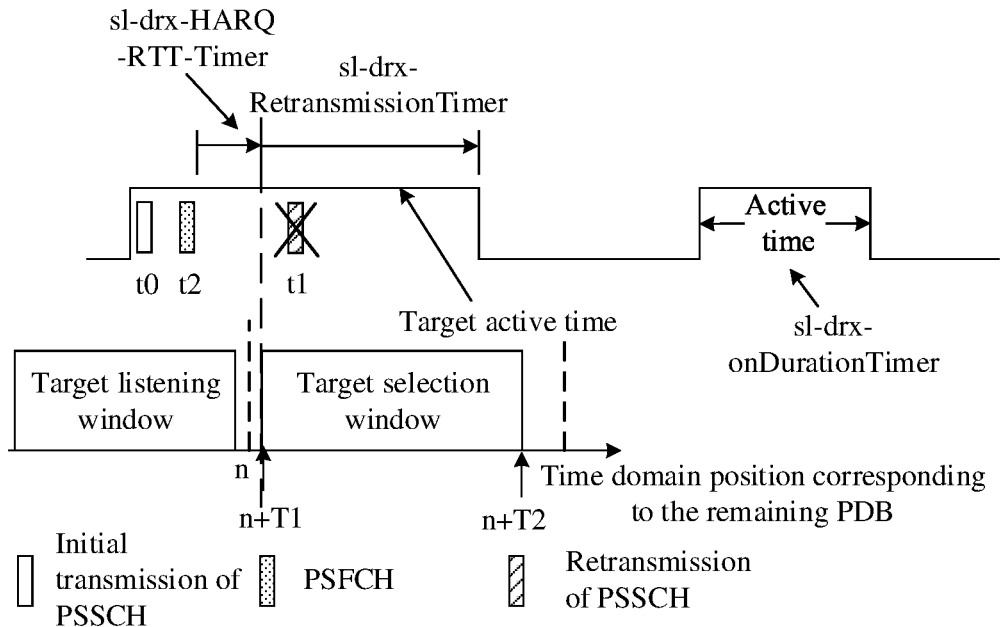
FIG. 13 is a schematic diagram of a sidelink transmission provided by an embodiment of the present disclosure.

Exemplary, FIG. 13 is a schematic diagram of a sidelink transmission provided by an embodiment of the present disclosure. As shown in FIG. 13, a first terminal performs an initial transmission of target data at a time domain position t0 and indicates to retransmit the target data through a resource at a time domain position t1, a second terminal transmits a PSFCH carrying a NACK to the first terminal at a time domain position t2, the second terminal starts a sidelink DRX-HARQ-RTT-Timer after transmitting the PSFCH. If the first terminal can know in advance that a resource at the time domain position t1 cannot be used to retransmit the target data, for example, the first terminal knows in advance that a uplink transmission is to be performed at the time domain position t1 based on scheduling information of a Physical Downlink Control Channel (PDCCH), the first terminal reselects a sidelink resource to retransmit the target data. A starting time domain position of a target selection window can be determined based on the sidelink DRX-HARQ-RTT-Timer. For example, a time domain position at which the sidelink DRX-HARQ-RTT-Timer is inactive is determined as the starting time domain position of the target selection window, or the time domain position at which the sidelink DRX-HARQ-RTT-Timer is inactive is determined as a time moment n at which the resource is reselected, and the starting time domain position of the target selection window is determined according to the time moment n.

The second implementation is described as follows.

Figure 14:
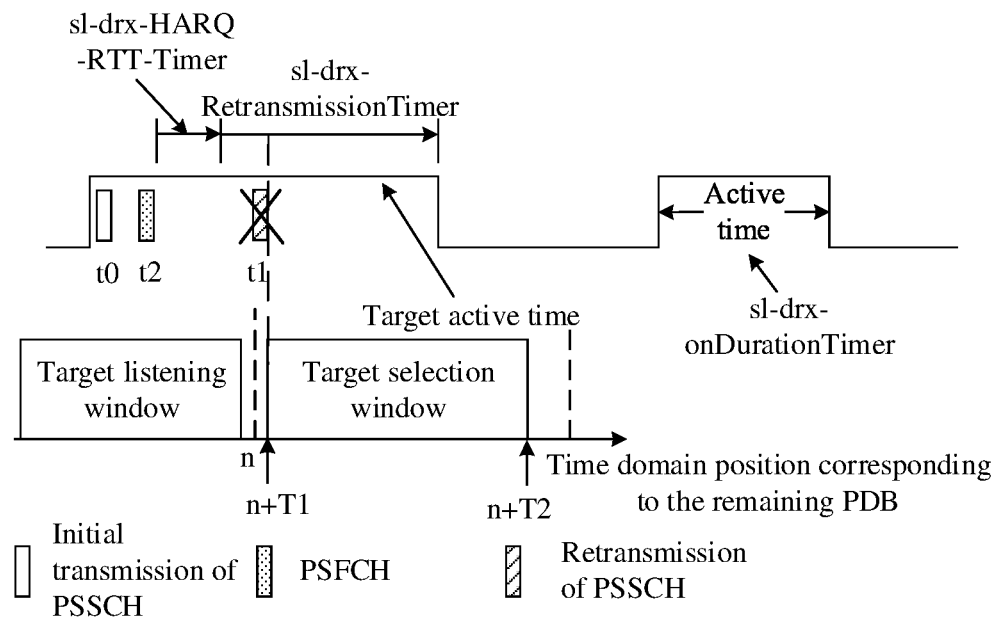
FIG. 14 is a schematic diagram of a sidelink transmission provided by another embodiment of the present disclosure.

FIG. 14 is a schematic diagram of a sidelink transmission provided by another embodiment of the present disclosure.

As shown in FIG. 14, a first terminal is triggered to select a resource before performing sidelink transmission. A physical layer determines a candidate resource set in a selection window according to a listening result of a listening window, and reports the candidate resource set to a higher layer. The higher layer randomly selects a transmission resource from the candidate resource set for initial transmission (such as a transmission resource at a time domain position t0 in FIG. 14) and retransmission (such as a transmission resource at a time domain position t1 in FIG. 14) of target data. These resources are preselected transmission resources, in which the transmission resources at the time domain position t1 are the above second sidelink transmission resources.

Optionally, if the first terminal determines that the second sidelink transmission resource cannot be used for the sidelink transmission when the second sidelink transmission resource is to be used for retransmitting sidelink data, the first terminal can reselect the sidelink resource to retransmit the target data. Therefore, the starting time domain position of the target selection window can be a time domain position of the second sidelink transmission resource or a time domain position corresponding to a slot next to the time domain position of the second sidelink transmission resource, which is not limited in the present disclosure. Alternatively, the first terminal reselects a resource at the time domain position of the second sidelink transmission resource or the time domain position corresponding to the slot next to the time domain position of the second sidelink transmission resource. That is, the time domain position of the second sidelink transmission resource or the time domain position corresponding to the slot next to the time domain position of the second sidelink transmission resource corresponds to a resource reselection slot n. Further, the starting time domain position of the target selection window is determined according to the resource reselection slot n, for example, the starting time domain position of the target selection window is $n+T_1$, where $0 \leq T_1 \leq T_{proc,1}^{SL}$, $T_{proc,1}^{SL}$ is determined according to a size of subcarrier spacing of the sidelink.

As shown in FIG. 14, the first terminal performs initial transmission of target data at the time domain position t0, and indicates through Sidelink Control Information (SCI) that a resource at the time domain position t1 are reserved to perform retransmission of the target data. The second terminal transmits a PSFCH carrying a NACK to the first terminal at the time domain position t2, and the second terminal starts the sidelink DRX-HARQ-RTT-Timer after transmitting the PSFCH and starts a sidelink DRX-retransmission timer when the sidelink DRX-HARQ-RTT-Timer is inactive. When the sidelink resource is to be used for retransmitting the target data at the time domain position t1, the terminal cannot use the sidelink resource for retransmitting the target data at the time domain position t1 because an uplink transmission having a higher priority is to be performed at the time domain position t1. The first terminal triggers resource reselection to retransmit the target data. The starting time domain position of the target selection window can be determined based on the second sidelink transmission resource, i.e., a time domain position corresponding to the sidelink resource of the time domain position t1. As described in FIG. 14, the first terminal can determine a time domain position corresponding to a slot next to the time domain position t1 as the starting time domain position of the target selection window.

The third implementation is described as follows.

As described above, the first time domain position is a time when the first terminal determines that the second sidelink transmission resource corresponding to the target data cannot be used.

Optionally, the first time domain position $t_d$ satisfies the following formula:

$$t_d \leq n + T_1,$$

where n represents a time when a higher layer of the first terminal triggers a physical layer to report a transmission resource set or a time when the first terminal reselects a resource, $n+T_1$ represents a starting time domain position of a target selection window.

Optionally, the starting time domain position of the target selection window is located after the first time domain position.

It should be understood that the first terminal may define an ending time domain position of the target selection window, to ensure that the first terminal can select the first sidelink transmission resource within a target active time and the first sidelink transmission resource can be used to transmit the target data. The ending time domain position of the target selection window is determined through implementations below, which is not limited thereto.

In a first implementation, the ending time domain position of the target selection window is determined according to a time domain position at which a target timer is inactive and a remaining PDB of the target data. The target timer is at least one of a sidelink DRX-retransmission timer, a sidelink DRX-deactivation timer and a sidelink DRX-onDuration timer.

In a second implementation, the ending time domain position of the target selection window is determined according to a remaining PDB of the target data.

The first implementation is described as follows.

It should be understood that if there is one target timer, the time domain position at which the target timer is inactive refers to a time domain position at which the one target timer is inactive. If there are multiple the target timers, a time domain position at which the plurality of the target timers are inactive refers to a time when all of the multiple the target timers are inactive. For example, if there are three target timers, which are the sidelink DRX-retransmission timer, the sidelink DRX-deactivation timer and the sidelink DRX-onDuration timer, the time domain position at which the target timer is inactive refers to a time when all of the three timers are inactive, that is, a time domain position at which the last timer in the three timers is inactive.

Optionally, if there is one target timer, the target timer can be a timer, an inactive time position of which is the latest, of the sidelink DRX-retransmission timer, the sidelink DRX-deactivation timer and the sidelink DRX-onDuration timer. This is because once the timer of the three timers which is the latest inactive is inactive, the target active time of the second terminal ends. In order to ensure that the first terminal can select the first sidelink transmission resource within the target active time, the first terminal considers the latest inactive timer among the three timers when determining the ending time domain position of the target selection window. Similarly, if there are multiple the target timers, the multiple the target timers can include a timer, an inactive time position of which is the latest, among the sidelink DRX-retransmission timer, the sidelink DRX-deactivation timer and the sidelink DRX-onDuration timer. This is also because once the timer of the three timers which is the latest inactive is inactive, the target active time of the second terminal ends. In order to ensure that the first terminal can select the first sidelink transmission resource within the target active time, the first terminal considers the latest inactive timer among the three timers when determining the ending time domain position of the target selection window. Therefore, the inactive time domain position of the target timer is also referred to as an ending time of the target active time of the second terminal.

Optionally, the ending time domain position of the target selection window is determined according to the time domain position at which the target timer is inactive and a time domain position corresponding to the remaining PDB of the target data. For example, the ending time domain position of the target selection window is a minimum value of the time domain position at which the target timer is inactive and the time domain position corresponding to the remaining PDB of the target data. For another example, the ending time domain position of the target selection window is earlier than the minimum value of the time domain position at which the target timer is inactive and the time domain position corresponding to the remaining PDB of the target data, which is not limited in the present disclosure.

It should be understood that the remaining PDB is a duration, that is, a period of time, that is to say, the remaining PDB is a relative time. Optionally, the remaining PDB is the PDB of the target data with respect to the first time domain position which is the time when the first terminal determines that the second sidelink transmission resource corresponding to the target data cannot be used. The time domain position corresponding to the remaining PDB is an absolute time, which is a sum of the first time domain position and the remaining PDB. That is, the time domain position corresponding to the remaining PDB is the absolute time corresponding to the PDB of the target data, and the absolute time is the sum of a time domain position at which initial transmission of the target data is performed and the PDB.

The above first implementation is described by following several examples.

Figure 15:
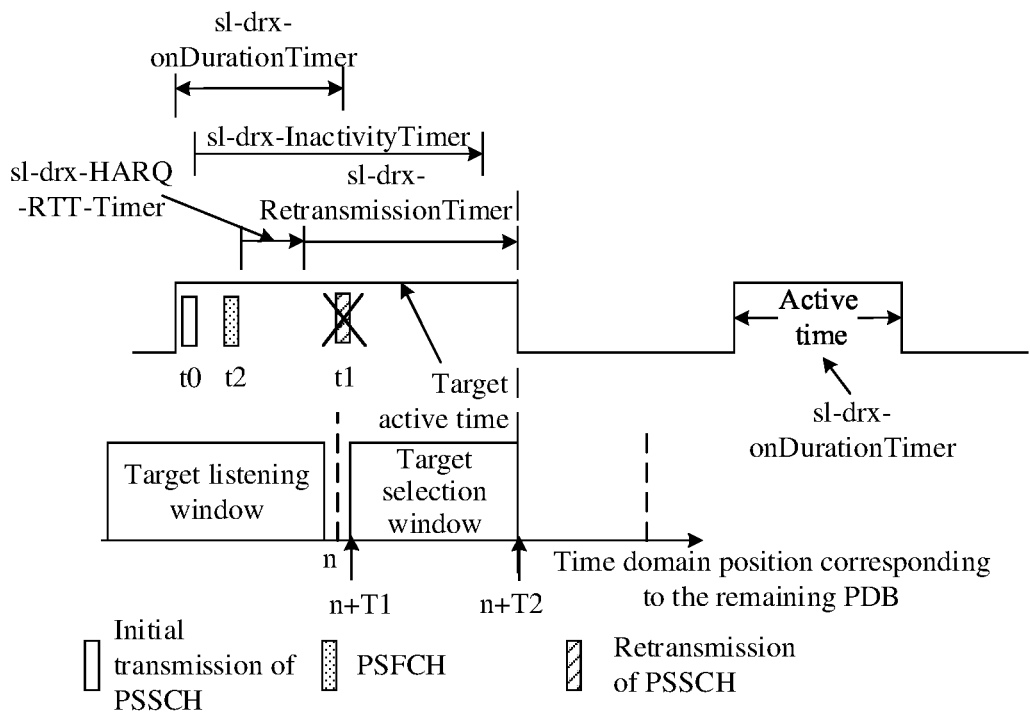
FIG. 15 is a schematic diagram of a sidelink transmission provided by an embodiment of the present disclosure.

In a first example, FIG. 15 is a schematic diagram of sidelink transmission provided by an embodiment of the present disclosure. As shown in FIG. 15, the second terminal starts the sidelink DRX-deactivation timer when receiving initial transmission of a PSSCH, and starts the sidelink DRX-retransmission timer when the sidelink DRX-HARQ-RTT-Timer is inactive. The sidelink DRX-deactivation timer and the sidelink DRX-onDuration timer are inactive before the sidelink DRX-retransmission timer. Therefore, the ending time domain position of the target active time of the second terminal is determined based on the time domain position at which the sidelink DRX-retransmission timer is inactive. Since the ending time domain position of the target active time is before the time domain position corresponding to the remaining PDB, the first terminal can determine the ending time domain position of the target selection window according the ending time domain position of the target active time. For example, as shown in FIG. 15, the first terminal takes the ending time domain position of the target active time, i.e., the time domain position at which the sidelink DRX-retransmission timer is inactive, as the ending time domain position of the target selection window.

Figure 16:
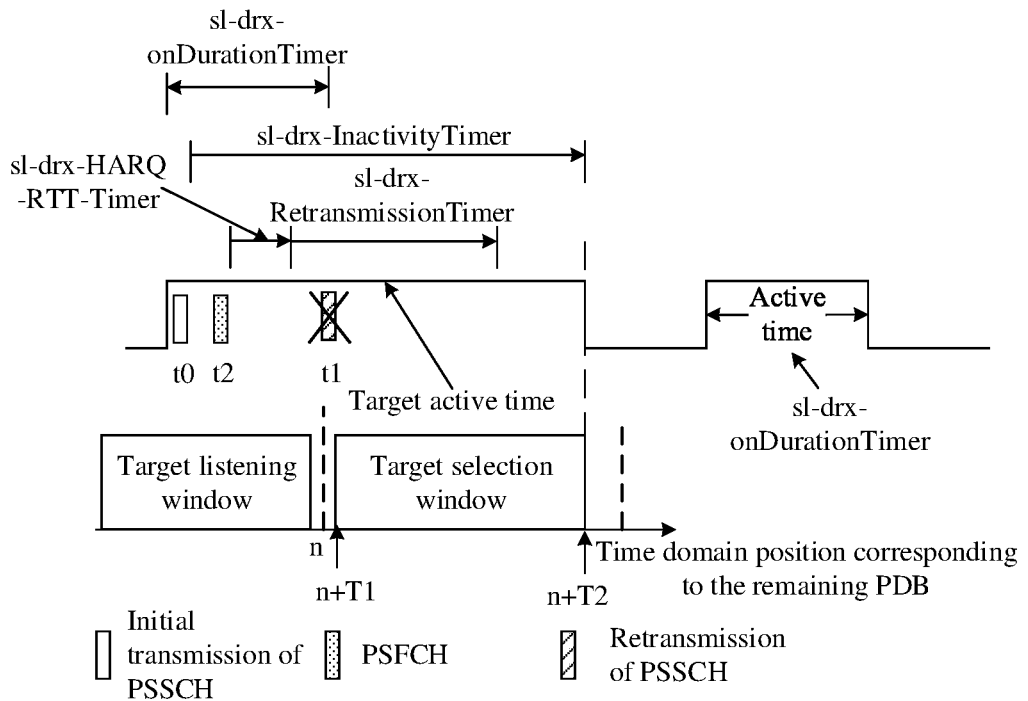
FIG. 16 is a schematic diagram of a sidelink transmission provided by another embodiment of the present disclosure.

In a second example, FIG. 16 is a schematic diagram of sidelink transmission provided by another embodiment of the present disclosure. As shown in FIG. 16, the second terminal starts the sidelink DRX-deactivation timer when receiving initial transmission of the PSSCH, and starts the sidelink DRX-retransmission timer when the sidelink DRX-HARQ-RTT-Timer is inactive. The sidelink DRX-retransmission timer and the sidelink DRX-onDuration timer are inactive before the sidelink DRX-deactivation timer. Therefore, the ending time domain position of the target active time of the second terminal is determined based on the time domain position at which the sidelink DRX-deactivation timer is inactive. Since the ending time domain position of the target active time is before the time domain position corresponding to the remaining PDB, the first terminal can determine the ending time domain position of the target selection window according the ending time domain position of the target active time. For example, as shown in FIG. 16, the first terminal takes the ending time domain position of the target active time, i.e., the time domain position at which the sidelink DRX-deactivation timer is inactive, as the ending time domain position of the target selection window.

Figure 17:
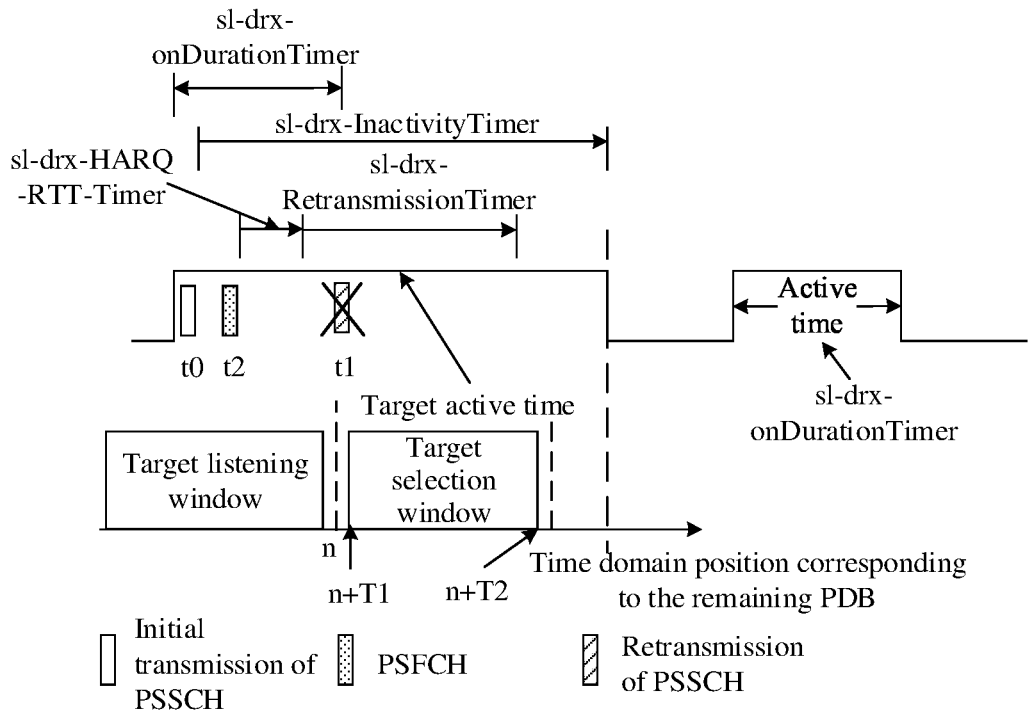
FIG. 17 is a schematic diagram of a sidelink transmission provided by yet another embodiment of the present disclosure.

In a third example, FIG. 17 is a schematic diagram of sidelink transmission provided by yet another embodiment of the present disclosure. As shown in FIG. 17, the second terminal starts the sidelink DRX-deactivation timer when receiving initial transmission of the PSSCH, and starts the sidelink DRX-retransmission timer when the sidelink DRX-HARQ-RTT-Timer is inactive. The sidelink DRX-retransmission timer and the sidelink DRX-onDuration timer are inactive before the sidelink DRX-deactivation timer. Therefore, the ending time domain position of the target active time of the second terminal is determined according to the time domain position at which the sidelink DRX-deactivation timer is inactive. Since the ending time domain position of the target active time is after the time domain position corresponding to the remaining PDB, the first terminal can set the ending time domain position of the target selection window be earlier than the time domain position corresponding to the remaining PDB.

It should be understood that, in the first implementation, since the ending time domain position of the target selection window is determined based on the target active time of the second terminal, the first sidelink transmission resource selected in the target selection window must be located within the target active time of the second terminal. Therefore, when the physical layer of the first terminal reports the candidate resource set to the higher layer, such as the MAC layer, the higher layer can randomly select the transmission resource from the candidate resource set for retransmitting the target data.

The second implementation is described as follows.

It should be understood that, when a first terminal selects a resource through a physical layer, if a higher layer does not inform the physical layer of information, such as the timer of the second terminal, the physical layer cannot determine the ending time domain position of the target selection window according to the target active time of the second terminal. At this time, the first terminal determines the ending time domain position of the target selection window according to the time domain position of the remaining PDB.

Optionally, the ending time domain position of the target selection window is earlier than or at the time domain position corresponding to the remaining PDB of the target data.

It should be understood that reference may be made to the above explanatory description regarding the time domain position corresponding to the remaining PDB, which is not explained in the present disclosure.

It should be understood that since the first terminal determines the ending time domain position of the target selection window based on the time domain position of the remaining PDB without considering the timer information of the second terminal, i.e., without considering the ending time domain position of the target active time of the second terminal, there may be a situation where the ending time domain position of the target selection window determined by the first terminal may be later than the ending time domain position of the target active time of the second terminal, which results in resources within a period of time from the ending time domain position of the target active time to the ending time domain position of the target selection window are unusable, because the first terminal is in an inactive time during the period of time. At this time, the first terminal can select the first sidelink transmission resource according to the target active time.

Figure 18:
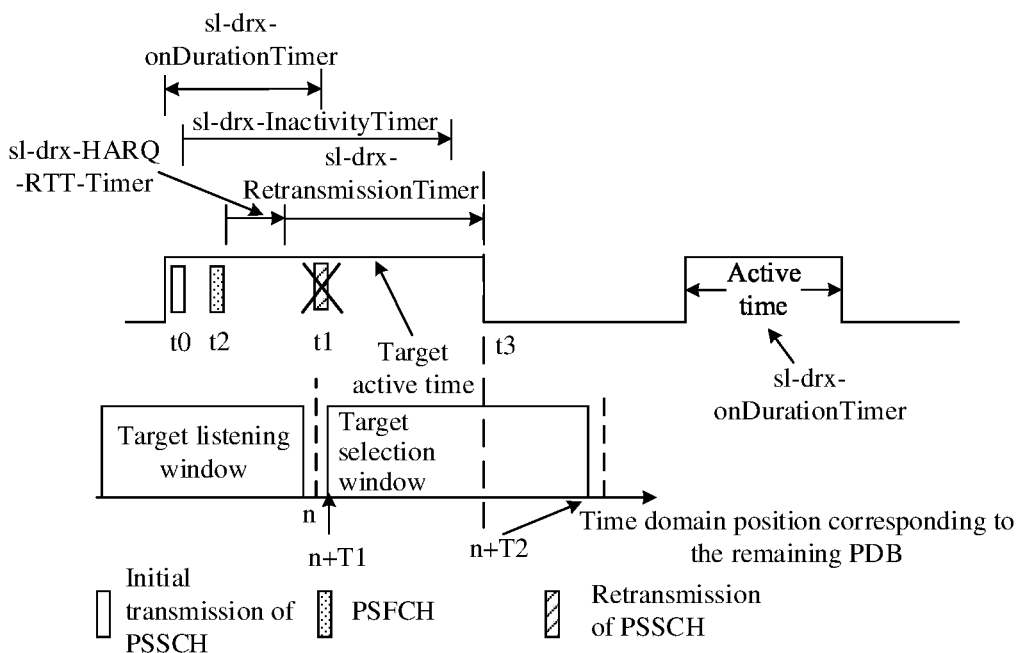
FIG. 18 is a schematic diagram of a sidelink transmission provided by an embodiment of the present disclosure.

Exemplary, FIG. 18 is a schematic diagram of sidelink transmission provided by an embodiment of the present disclosure. As shown in FIG. 18, the ending time domain position of the target active time of the second terminal is earlier than the time domain position corresponding to the remaining PDB. If the first terminal determines the ending time domain position of the target selection window according to the time domain position corresponding to the remaining PDB, the first terminal reports a candidate resource set determined in the target selection window to a higher layer. When selecting a resource from the candidate resource set, the higher layer cannot randomly select a resource from the candidate resource set reported by the physical layer, because the resources in the time range [t3, n+T2] correspond to the inactive time of the second terminal, during which the resources cannot be selected, where t3 is a time domain position determined according to the ending position of the target active time, for example, t3 corresponds to a slot next to the ending time domain position of the target active time, at which the higher layer can only select the first sidelink transmission resource from the resources before t3 in the candidate resource set.

To sum up, in the present disclosure, the first terminal can determine the starting time domain position and the ending time domain position of the target selection window, so that the first terminal can select the first sidelink transmission resource within the target active time, and transmit the target data using the first sidelink transmission resource.

Figure 19:
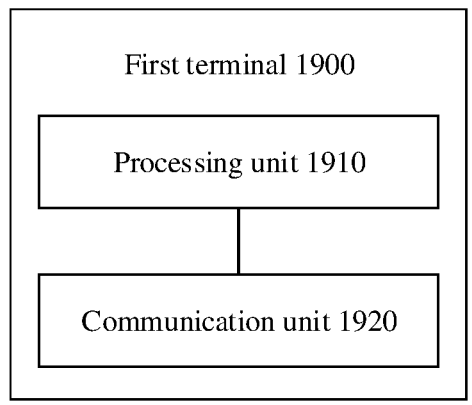
FIG. 19 is a schematic diagram of a terminal device 1900 provided by an embodiment of the present disclosure.

FIG. 19 is a schematic diagram of a terminal device 1900 provided by an embodiment of the present disclosure, the terminal device is the above first terminal. The terminal device 1900 includes a processing unit 1910 and a communication unit 1920. The processing unit 1910 is configured to select a first sidelink transmission resource when determining that there is no available sidelink transmission resource for retransmitting target data within target active time of a second terminal. The communication unit 1920 is configured to retransmit target data through the first sidelink transmission resource.

Optionally, the processing unit 1910 is configured to select the first sidelink transmission resource in a target selection window.

Optionally, the processing unit 1910 is configured to determine a candidate resource set according to resources in the target selection window, and select the first sidelink transmission resource in the candidate resource set.

Optionally, the processing unit 1910 is configured to take a set of all resources in the target selection window as a candidate resource set, and randomly select the sidelink transmission resource from the candidate resource set.

Optionally, the processing unit 1910 is configured to determine a candidate resource set in the target selection window according to a listening result of a target listening window, and randomly select the sidelink transmission resource from the candidate resource set.

Optionally, a starting time domain position of the target selection window is determined according to a sidelink DRX-HARQ-RTT-Timer.

Optionally, the starting time domain position of the target selection window is determined according to a time domain position at which the sidelink DRX-HARQ-RTT-Timer is inactive.

Optionally, the starting time domain position of the target selection window is a time domain position at which the sidelink DRX-HARQ-RTT-Timer is inactive or a time domain position corresponding to a slot next to the time domain position at which the sidelink DRX-HARQ-RTT-Timer is inactive.

Optionally, the starting time domain position of the target selection window is determined according to a time domain position of second sidelink transmission resource corresponding to the target data. The second sidelink transmission resource is a sidelink transmission resource for retransmitting the target data determined before the first terminal determines that there is no available sidelink transmission resource for retransmitting the target data within the active time of the second terminal.

Optionally, the starting time domain position of the target selection window is a time domain position of the second sidelink transmission resource or a time domain position corresponding to a slot next to the time domain position of the second sidelink transmission resource.

Optionally, the starting time domain position of the target selection window is determined according to a first time domain position. The first time domain position is a time domain position at which the first terminal determines that the second sidelink transmission resource is unavailable, and the second sidelink transmission resource is a sidelink transmission resource for retransmitting the target data determined before the first terminal determines that there is no available sidelink transmission resource for retransmitting the target data within the active time of the second terminal.

Optionally, the starting time domain position of the target selection window is after the first time domain position.

Optionally, the first time domain position is within the target active time.

Optionally, an ending time domain position of the target selection window is determined according to a time domain position at which a target timer is inactive and a remaining Packet Delay Budget (PDB) of the target data. The target timer is at least one of: a sidelink DRX-retransmission timer, a sidelink DRX-deactivation timer and a sidelink DRX-onDuration timer.

Optionally, the ending time domain position of the target selection window is determined according to the time domain position at which the target timer is inactive and a time domain position corresponding to the remaining PDB of the target data.

Optionally, the ending time domain position of the target selection window is a minimum value of the time domain position at which the target timer is inactive and the time domain position corresponding to the remaining PDB of the target data.

Optionally, in a case that there are multiple the target timers, the time domain position at which the target timer is inactive is a time domain position at which all of the multiple target timers are inactive.

Optionally, the ending time domain position of the target selection window is determined according to a time domain position at which the target active time ends and a remaining PDB of the target data.

Optionally, the ending time domain position of the target selection window is determined according to the time domain position at which the target active time ends and a time domain position corresponding to the remaining PDB of the target data.

Optionally, the ending time domain position of the target selection window is a minimum value of the time domain position at which the target active time ends and the time domain position corresponding to the remaining PDB of the target data.

Optionally, the ending time domain position of the target selection window is determined according to a remaining PDB of the target data.

Optionally, the ending time domain position of the target selection window is determined according to a time domain position corresponding to the remaining PDB of the target data.

Optionally, the ending time domain position of the target selection window is earlier than or at the time domain position corresponding to the remaining PDB of the target data.

Optionally, in some embodiments, the above communication unit may be a communication interface or a transceiver, or an input/output interface of a communication chip or an on-chip system. The above processing unit may be one or more processors.

It should be understood that the terminal device 1900 according to the embodiments of the present disclosure may correspond to the first terminal in the method embodiments of the present disclosure, and the above and other operations and/or functions of the individual units in the terminal device 1900 are used to respectively implement the corresponding flow of the first terminal in the above method embodiments. For the sake of simplicity, it will not be elaborated herein.

Figure 20:
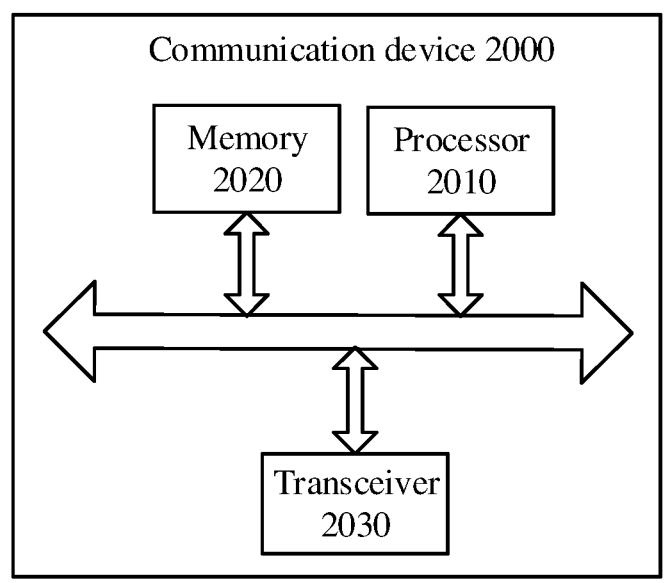
FIG. 20 is a schematic structural diagram of a communication device 2000 provided by an embodiment of the present disclosure.

FIG. 20 is a schematic structural diagram of a communication device 2000 according to an embodiment of the present disclosure, the communication device 2000 shown in FIG. 20 includes a processor 2010 that can call and run a computer program from a memory to implement the method in embodiments of the present disclosure.

Optionally, as shown in FIG. 20, the communication device 2000 may further include a memory 2020. The processor 2010 may call and run a computer program from the memory 2020 to implement the method in embodiments of the present disclosure.

The memory 2020 may be a separate device independent of the processor 2010 or may be integrated in the processor 2010.

Optionally, as shown in FIG. 20, the communication device 2000 may further include a transceiver 2030. The processor 2010 may control the transceiver 2030 to communicate with other devices. Specifically, the transceiver 2030 may transmit information or data to other devices or receive information or data transmitted by other devices.

The transceiver 2030 may include a transmitter and a receiver. The transceiver 2030 may further include antennas, and the number of the antennas may be one or more.

Optionally, the communication device 2000 can be the first terminal of the embodiments of the present disclosure, and the communication device 2000 can implement corresponding processes implemented by the first terminal in the various methods according to the embodiments of the present disclosure, which is not described repeatedly for the sake of simplicity.

Figure 21:
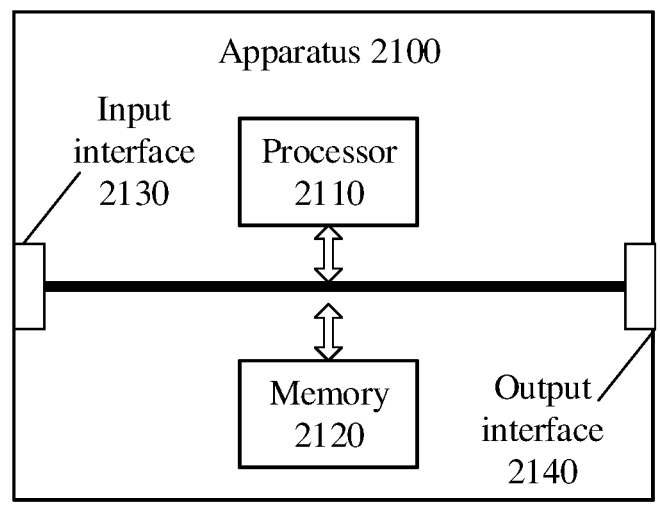
FIG. 21 is a schematic structural diagram of an apparatus provided by an embodiment of the present disclosure.

FIG. 21 is a schematic structural diagram of an apparatus 2100 according to an embodiment of the present disclosure. The apparatus 2100 shown in FIG. 21 includes a processor 2110. The processor 2110 can call and run computer programs from a memory to implement the method in the embodiments of the present disclosure.

Optionally, as shown in FIG. 21, the apparatus 2100 may further include a memory 2120. The processor 2110 can call and run the computer program from the memory 2120 to implement the method in the embodiments of the present disclosure.

The memory 2120 may be a separate device independent of the processor 2110 or may be integrated into the processor 2110.

Optionally, the apparatus 2100 may further include an input interface 2130. The processor 2110 can control the input interface 2130 to communicate with other devices or chips, and in particular obtaining information or data sent by other devices or chips.

Optionally, the apparatus 2100 may further include an output interface 2140. The processor 2110 may control the output interface 2140 to communicate with other devices or chips, and in particular outputting information or data to other devices or chips.

Optionally, the apparatus can be applied to the first terminal in the embodiments of the present disclosure, and the apparatus can implement the corresponding processes implemented by the first terminal in various methods according to the embodiments of the present disclosure, which is not described repeatedly for the sake of brevity.

Optionally, the apparatus mentioned in the embodiments of the present disclosure can also be a chip, such as a system level chip, a system chip, a chip system or an on-chip system chip, etc.

Figure 22:
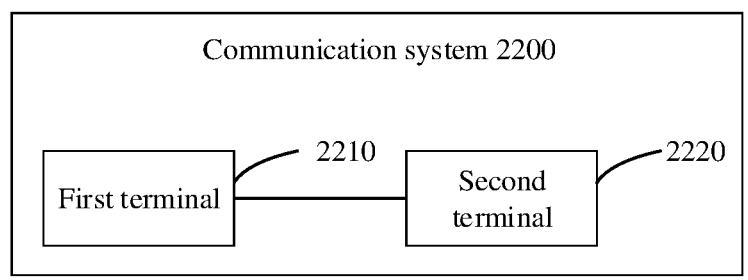
FIG. 22 is a schematic block diagram of a communication system 2200 provided by an embodiment of the present disclosure.

FIG. 22 is a schematic block diagram of a communication system provided according to an embodiment of the present disclosure. As shown in FIG. 22, the communication system 2200 includes a first terminal 2210 and a second terminal 2220.

The first terminal 2210 may be used to implement corresponding functions implemented by the first terminal in the above methods, and the second terminal 2220 may be used to implement corresponding functions implemented by the second terminal in the above methods, which is not described repeatedly for the sake of brevity.

It is to be understood that the processor in the embodiments of the present disclosure may be an integrated circuit chip having signal processing capability. In the implementation process, various operations in the above method embodiment can be implemented by an integrated logic circuit of hardware in the processor or instructions in the form of software. The above processor can be a general purpose processor, a digital signal processor (DSPS), an application specific integrated circuit (ASIC), a field programmable gate array (FPGA) or other programmable logic devices, discrete gates or transistor logic devices, and discrete hardware components. Various methods, operations and logic block diagrams disclosed in the embodiments of the present disclosure can be implemented or executed. The general-purpose processor may be a microprocessor or the processor may be any conventional processor or the like. The operations of the methods disclosed in connection with the embodiments of the present disclosure can be directly implemented by a hardware decoding processor, or by an combination of the hardware and software modules in the decoding processor. The software module can be located in a random memory, a flash memory, a read-only memory, a programmable read-only memory or an electrically erasable programmable memory, a register and other mature storage media in the art. The storage medium is located in the memory, and the processor reads information in the memory and implements the operations of the above methods in combination with its hardware.

It is to be understood that the memory in the embodiments of the present disclosure may be a volatile memory or a non-volatile memory, or may include both a volatile and a non-volatile memory. The nonvolatile memory can be a read-only memory (ROM), a programmable ROM (PROM), an erasable PROM (EPROM), an electrically EPROM (EEPROM) or a flash memory. The Volatile memory can be a random access memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the systems and methods described herein is intended to include, but is not limited to, memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM, a DR RAM, etc. That is, the memory in the embodiments of the disclosure is intended to include but not limited to memories of these and any other suitable type.

The embodiments of the disclosure also provide a computer-readable storage medium for storing one or more computer programs.

Optionally, the computer-readable storage medium may be applied to the network device or the base station of the embodiments of the disclosure. The computer programs may enable a computer to perform the corresponding processes implemented by the network device or the base station in various methods of the embodiments of the disclosure, which will not be elaborated herein for brief description.

Optionally, the computer-readable storage medium may be applied to the mobile terminal or the terminal device of the embodiments of the disclosure. The computer programs may enable a computer to perform the corresponding processes implemented by the mobile terminal or the terminal device in various methods of the embodiments of the disclosure, which will not be elaborated herein for brief description.

The embodiments of the disclosure also provide a computer program product including computer program instructions.

Optionally, the computer program product may be applied to the network device or the base station of the embodiments of the disclosure. The computer program instructions may enable a computer to perform the corresponding processes implemented by the network device or the base station in various methods of the embodiments of the disclosure, which will not be elaborated herein for brief description.

Optionally, the computer program product may be applied to the mobile terminal or the terminal device of the embodiments of the disclosure. The computer program instructions may enable a computer to perform the corresponding processes implemented by the mobile terminal or the terminal device in various methods of the embodiments of the disclosure, which will not be elaborated herein for brief description.

The embodiments of the disclosure also provide a computer program.

Optionally, the computer program may be applied to the network device or the base station of the embodiments of the disclosure. The computer program, when executed by a computer, enables the computer to perform the corresponding processes implemented by the network device or the base station in various methods of the embodiments of the disclosure, which will not be elaborated herein for brief description.

Optionally, the computer program may be applied to the mobile terminal or the terminal device of the embodiments of the disclosure. The computer program, when executed by a computer, enables the computer to perform the corresponding processes implemented by the mobile terminal or the terminal device in various methods of the embodiments of the disclosure, which will not be elaborated herein for brief description.

Those of ordinary skill in the art may realize that the units and algorithm operations of various examples described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that regarding the operation processes of the system, device and unit described above, reference may be made to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between various displayed or discussed components may be indirect coupling or communication connection of the device or the units implemented through some interfaces, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected according to a practical requirement to achieve the purpose of the solutions of the embodiments.

In addition, various functional units in various embodiments of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium.

Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the methods in various embodiments of the disclosure. The abovementioned storage medium includes: various media capable of storing program codes such as a U disk, a mobile hard disk, a ROM, a RAM, a magnetic disk or an optical disk.

Only the specific implementation mode of the disclosure are described above and are not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall conform to the scope of protection of the claims.

The invention claimed is:

1. A method for wireless communication, comprising:
selecting a first sidelink transmission resource by a first terminal when the first terminal determines that there is no available sidelink transmission resource for retransmitting target data within target active time of a second terminal; and
retransmitting, by the first terminal, the target data through the first sidelink transmission resource,
wherein the selecting the first sidelink transmission resource by the first terminal comprises: selecting, by the first terminal, the first sidelink transmission resource in a target selection window,
wherein a starting time domain position of the target selection window is determined according to a time domain position of a second sidelink transmission resource corresponding to the target data, and
wherein the second sidelink transmission resource is a sidelink transmission resource for retransmitting the target data determined before the first terminal determines that there is no available sidelink transmission resource for retransmitting the target data within the active time of the second terminal.

2. The method of claim 1, wherein the starting time domain position of the target selection window is a time domain position corresponding to a slot next to the time domain position of the second sidelink transmission resource.

3. The method of claim 1, wherein an ending time domain position of the target selection window is determined according to a time domain position corresponding to a remaining Packet Delay Budget (PDB) of the target data.

4. The method of claim 3, wherein the ending time domain position of the target selection window is earlier than or at the time domain position corresponding to the remaining PDB of the target data.

5. A terminal device, the terminal device being a first terminal, comprising:
a processor;
a transceiver; and
a memory for storing a computer program,
wherein the processor is configured to call and run the computer program in the memory to: select a first sidelink transmission resource when there is no available sidelink transmission resource for retransmitting target data within target active time of a second terminal, and
the transceiver is configured to retransmit target data through the first sidelink transmission resource,
wherein the processor is configured to call and run the computer program in the memory to:
select the first sidelink transmission resource in a target selection window,
wherein a starting time domain position of the target selection window is determined according to a time domain position of second sidelink transmission resource corresponding to the target data, and
wherein the second sidelink transmission resource is a sidelink transmission resource for retransmitting the target data determined before the first terminal determines that there is no available sidelink transmission resource for retransmitting the target data within the active time of the second terminal.

6. The terminal device of claim 5, wherein the starting time domain position of the target selection window is a time domain position corresponding to a slot next to the time domain position of the second sidelink transmission resource.

7. The terminal device of claim 5, wherein an ending time domain position of the target selection window is determined according to a time domain position corresponding to a remaining Packet Delay Budget (PDB) of the target data.

8. The terminal device of claim 7, wherein the ending time domain position of the target selection window is earlier than or at the time domain position corresponding to the remaining PDB of the target data.

9. A chip, comprising a processor and a memory, wherein the processor is configured to call and nm a computer program from the memory, to cause a first terminal on which the chip is installed to perform:
selecting a first sidelink transmission resource when there is no available sidelink transmission resource for retransmitting target data within target active time of a second terminal; and
retransmitting the target data through the first sidelink transmission resource,
wherein the processor is configured to call and run the computer program to cause the first terminal to perform:
selecting the first sidelink transmission resource in a target selection window,
wherein a starting time domain position of the target selection window is determined according to a time domain position of a second sidelink transmission resource corresponding to the target data, and
wherein the second sidelink transmission resource is a sidelink transmission resource for retransmitting the target data determined before the first terminal determines that there is no available sidelink transmission resource for retransmitting the target data within the active time of the second terminal.

10. The chip of claim 9, wherein the starting time domain position of the target selection window is a time domain position corresponding to a slot next to the time domain position of the second sidelink transmission resource.

11. The chip of claim 9, wherein an ending time domain position of the target selection window is determined according to a time domain position corresponding to a remaining Packet Delay Budget (PDB) of the target data, and wherein the ending time domain position of the target selection window is earlier than or at the time domain position corresponding to the remaining PDB of the target data.

* * * * *